(12) United States Patent
Haynes et al.

(10) Patent No.: US 8,909,224 B2
(45) Date of Patent: Dec. 9, 2014

(54) CONNECTING DEVICE VIA MULTIPLE CARRIERS

(75) Inventors: Thomas W. Haynes, San Ramon, CA (US); Sagiv Draznin, Walnut Creek, CA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 402 days.

(21) Appl. No.: 13/102,460

(22) Filed: May 6, 2011

(65) Prior Publication Data

US 2012/0282915 A1    Nov. 8, 2012

(51) Int. Cl.
| | |
|---|---|
| H04W 4/00 | (2009.01) |
| H04M 1/00 | (2006.01) |
| H04M 15/00 | (2006.01) |
| H04W 4/24 | (2009.01) |
| H04M 7/00 | (2006.01) |
| H04L 29/06 | (2006.01) |
| H04M 17/00 | (2006.01) |
| H04M 17/02 | (2006.01) |
| H04W 68/12 | (2009.01) |
| H04W 12/06 | (2009.01) |
| H04W 88/06 | (2009.01) |

(52) U.S. Cl.
CPC ........... *H04L 65/1016* (2013.01); *H04M 15/85* (2013.01); *H04W 4/24* (2013.01); *H04M 7/0066* (2013.01); *H04L 65/105* (2013.01); *H04M 17/10* (2013.01); *H04M 17/02* (2013.01); *H04M 15/84* (2013.01); *H04M 17/103* (2013.01); *H04M 15/49* (2013.01); *H04L 65/103* (2013.01); *H04M 15/856* (2013.01); *H04W 12/06* (2013.01); *H04L 65/1006* (2013.01); *H04W 68/12* (2013.01); *H04L 65/1069* (2013.01); *H04M 17/026* (2013.01); *H04W 88/06* (2013.01); *H04M 15/83* (2013.01); *H04M 15/8353* (2013.01)
USPC ................. 455/435.1; 455/422.1; 455/426.1; 455/552.1

(58) Field of Classification Search
CPC ......... H04W 88/06; H04W 4/16; H04W 8/26; H04W 48/18; H04W 60/00; H04W 76/02; H04W 88/16; H04W 8/18; H04W 8/22; H04W 92/08; H04W 4/02; H04W 84/12; H04M 1/72519; H04M 2250/14; H04M 3/436
USPC ............. 455/558, 552.1–553.1, 426.1–426.2, 455/435.1–435.3, 448
See application file for complete search history.

(56) References Cited

U.S. PATENT DOCUMENTS

| | | | | |
|---|---|---|---|---|
| 6,119,020 | A | * | 9/2000 | Miller et al. ................... 455/558 |
| 6,125,283 | A | * | 9/2000 | Kolev et al. ................. 455/552.1 |
| 6,185,436 | B1 | * | 2/2001 | Vu ................................ 455/558 |

(Continued)

OTHER PUBLICATIONS

3rd Generation Partnership Project; Technical Specification Group SA3; Access security for IP-based services (Release 5), 3GPP TS 33.203 v1.0.0 (Dec. 2001), pp. 25-26.*

*Primary Examiner* — Matthew Sams

(57) ABSTRACT

A user device establishes a first connection with a first carrier network of a first carrier. The first carrier issues a first phone number used by the user device. The user device further establishes a second connection with a second carrier network of a second carrier. The second carrier issues a second phone number used by the user device. The user device receives a notification about a call from the first carrier network while connected to the first carrier network and the second carrier network.

20 Claims, 6 Drawing Sheets

(56) References Cited

U.S. PATENT DOCUMENTS

| | | | |
|---|---|---|---|
| 6,667,968 B1* | 12/2003 | Tran | 370/352 |
| 7,369,848 B2* | 5/2008 | Jiang | 455/432.3 |
| 7,627,338 B2* | 12/2009 | Hicks et al. | 455/552.1 |
| 7,701,974 B2* | 4/2010 | Mayer et al. | 370/474 |
| 7,706,839 B2* | 4/2010 | Ueno | 455/558 |
| 7,852,831 B2* | 12/2010 | Akbar | 370/352 |
| 7,912,497 B2* | 3/2011 | Isidore et al. | 455/552.1 |
| 8,010,152 B2* | 8/2011 | Kim | 455/552.1 |
| 8,204,536 B2* | 6/2012 | Franklin et al. | 455/550.1 |
| 8,229,399 B2* | 7/2012 | Tanabe | 455/411 |
| 8,478,277 B2* | 7/2013 | Jiang | 455/445 |
| 8,494,504 B2* | 7/2013 | Kirchhoff et al. | 455/417 |
| 2002/0006808 A1* | 1/2002 | Onaka et al. | 455/550 |
| 2003/0159067 A1* | 8/2003 | Stirbu | 713/201 |
| 2005/0190747 A1* | 9/2005 | Sindhwani et al. | 370/352 |
| 2005/0238171 A1* | 10/2005 | Chen et al. | 380/270 |
| 2006/0063565 A1* | 3/2006 | Ueno | 455/558 |
| 2006/0187900 A1* | 8/2006 | Akbar | 370/352 |
| 2006/0234693 A1* | 10/2006 | Isidore et al. | 455/422.1 |
| 2006/0270441 A1* | 11/2006 | Miyata | 455/522 |
| 2007/0015546 A1* | 1/2007 | Ito | 455/566 |
| 2007/0032225 A1* | 2/2007 | Konicek et al. | 455/417 |
| 2007/0064682 A1* | 3/2007 | Adams et al. | 370/352 |
| 2007/0099638 A1* | 5/2007 | Voltz | 455/500 |
| 2007/0167167 A1* | 7/2007 | Jiang | 455/453 |
| 2007/0174443 A1* | 7/2007 | Shaheen et al. | 709/223 |
| 2008/0020773 A1* | 1/2008 | Black et al. | 455/445 |
| 2008/0064443 A1* | 3/2008 | Shin et al. | 455/558 |
| 2008/0096555 A1* | 4/2008 | Herrmann | 455/435.1 |
| 2008/0242282 A1* | 10/2008 | Kuhl et al. | 455/415 |
| 2008/0247383 A1* | 10/2008 | Liu et al. | 370/352 |
| 2008/0248799 A1* | 10/2008 | Choi | 455/426.1 |
| 2009/0061932 A1* | 3/2009 | Nagarajan | 455/558 |
| 2009/0080411 A1* | 3/2009 | Lyman | 370/352 |
| 2009/0150562 A1* | 6/2009 | Kim et al. | 709/238 |
| 2009/0156209 A1* | 6/2009 | Franklin et al. | 455/435.2 |
| 2009/0181671 A1* | 7/2009 | Preiss et al. | 455/435.1 |
| 2010/0232368 A1* | 9/2010 | Bogner et al. | 370/329 |

* cited by examiner

CONNECTING DEVICE VIA MULTIPLE CARRIERS

BACKGROUND

Users are increasingly relying on mobile phone devices to stay in contact with other people for business and personal reasons. Carriers provide mobile phone services within limit geographic areas (e.g., a particular country). Users who travel between multiple locations, with different carriers, often want to simultaneously be accessible and use multiple local phone numbers associated with those locations. Currently, standard mobile phones allow a user to place/receive calls only via a single local phone number issued by a carrier. As a result, a user who wants to utilize local numbers in, for example, multiple countries must carry multiple mobile phones. To be accessible by a primary local number while in a foreign country or market, the user must roam with a primary mobile phone associated with the primary local number. A mobile phone with dual subscriber identity module (SIM) cards may, theoretically, allow a user of the mobile phone to communicate by using two different local numbers. However, the dual SIM cards require specialized hardware that supports the dual SIM cards. Furthermore, the dual SIM cards require a user to roam using any one of the two dual SIM cards in multiple countries.

DETAILED DESCRIPTION OF PREFERRED EMBODIMENTS

The following detailed description refers to the accompanying drawings. The same reference numbers in different drawings may identify the same or similar elements.

A carrier may refer to one or more of a mobile network operator (MNO), a mobile phone operator, a mobile operator, a carrier service provider (CSP), a wireless service provider, a wireless carrier, a cellular company, and/or any other company that provides mobile phone service(s) to users (e.g., subscribers of the carrier) via a network. Herein, a carrier may also refer to the carrier network (e.g., a cellular network) provided and operated by the carrier.

An implementation, described herein, may allow a mobile phone device, which includes only a single SIM card, to connect to multiple carrier networks. The mobile phone device may use a first local phone number issued by a first carrier and a second local phone number issued by a second, different, carrier. The mobile phone device may connect to an Internet protocol (IP) multimedia subsystem (IMS) core of the first carrier and to an IMS core of the second carrier. The mobile phone device may receive, via the IMS core of the first carrier, phone calls from other user devices that call the first local phone number and may receive, via the IMS core of the second carrier, phone calls from other user devices that call the second local phone number. The second carrier may handle the call as a local call. A user of the mobile phone device may elect to make an outgoing call by using the first carrier or the second carrier. The recipient of the call may view, for example, the second local phone number as a source of the call when the user selects the second carrier.

Figure 1:
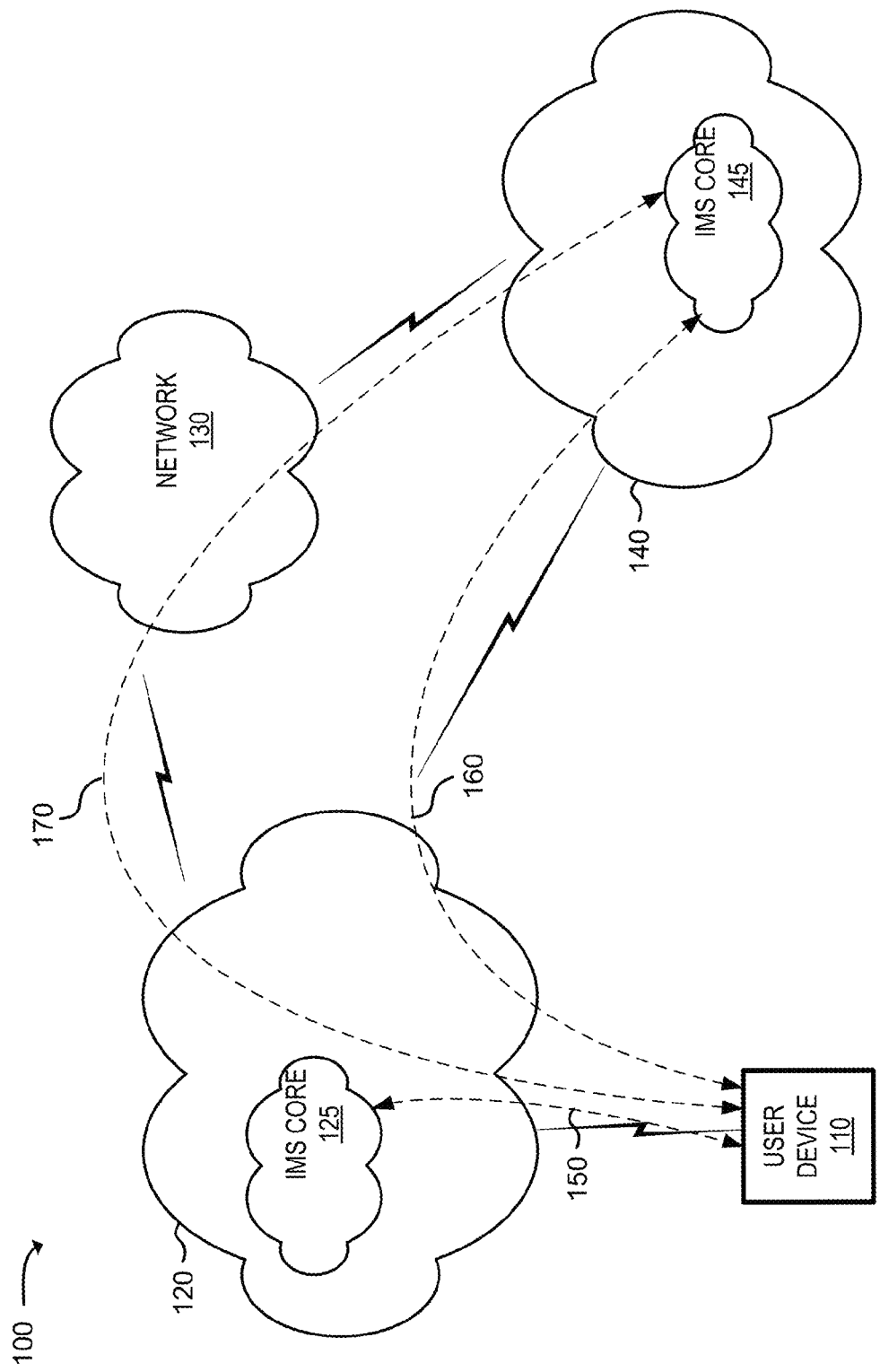
FIG. 1 is a diagram of an example environment in which systems and/or methods described herein may be implemented.

FIG. 1 is a diagram of an example environment 100 in which systems and/or methods described herein may be implemented. Environment 100 may include one or more of the following elements: a user device 110, a first carrier network 120, a network 130, and a second carrier network 140. While FIG. 1 shows a particular number and arrangement of elements, environment 100 may include additional, fewer, different, or differently arranged elements than are illustrated in FIG. 1.

User device 110 may include any computation or communication device, such as a wireless mobile communication device that is capable of communicating with first carrier network 120. For example, user device 110 may include a mobile telephone device, a radiotelephone, a personal communications system (PCS) terminal (e.g., that may combine a cellular radiotelephone with data processing and data communications capabilities), a personal digital assistant (PDA) (e.g., that can include a radiotelephone, a pager, Internet/intranet access, etc.), a smart phone, a laptop computer, a camera, a personal gaming system, or another type of mobile computation or communication device.

User device 110 may include a single SIM card (e.g., a Universal Integrated Circuit Card (UICC) with a SIM application) that may provide information for authentication of user device 110 by first carrier network 120 and/or second carrier network 140. The information for authentication may include a unique identifier associated with user device 110. User device 110 may execute an IMS client that allows user device 110 to connect to/communicate with IMS applications of first carrier network 120 and/or second carrier network 140. User device 110 may place calls to other user devices and/or receive calls from other user devices via first carrier network 120 and/or second carrier network 140.

First carrier network 120 may include any cellular network (e.g., a mobile phone network) that provides users (e.g., subscribers), of a first carrier, cellular phone service within a particular geographic area (e.g., the United States of America (USA)). The first carrier may issue a local phone number that user device 110 may use to place and/or receive calls via first carrier network 120.

First carrier network 120 may include an IMS core 125. IMS core 125 may include an architectural framework for providing IP multimedia services, including voice services. For example, IMS core 125 may include a network that delivers IP multimedia services via one or more protocols (e.g., via a session initiation protocol (SIP)). IMS core 125 may include call session control functions (CSCF) components, including one or more interrogating call session control functions (I-CSCFs), one or more serving call session control functions (S-CSCFs), and/or one or more proxy call session control functions (P-CSCFs). Further details of I-CSCFs, S-CSCFs, and/or P-CSCFs are provided below in connection with, for example, FIG. 2.

Network 130 may include the Internet, which includes a global system of interconnected computer networks that rely on the Transmission Control Protocol/Internet Protocol (TCP/IP). Network 130 may use IP Version 4 (IPv4) and/or IP Version 6 (IPv6) to identify and locate devices (e.g., user device 110), which are assigned IP addresses and are connected (e.g., via first carrier network 120 and/or one or more other networks) to network 130. Network 130 may also allow Voice over IP (VoIP) services that facilitate voice communications and multimedia sessions over network 130. User device 110 may connect to second carrier network 140 via network 130, as described further below.

Second carrier network 140 may perform the same type of functions as first carrier network 120 for a different geographic area. For example, first carrier network 120 may provide cellular phone service within a first country (e.g., the USA) and second carrier network 140 may provide cellular phone service within a second country (e.g., Israel) that is different than the first country. Second carrier network 140 may include an IMS core 145. IMS core 145 may include an IMS network comparable to that of IMS core 125. Second carrier network 140 and IMS core 145 may include similar and/or different components than first carrier network 120 and/or IMS core 125, respectively.

In one implementation, a first carrier that operates first carrier network 120 may issue a first local phone number to user device 110. The first local phone number may be local to a geographic area covered by first carrier network 120. A second carrier that operates second carrier network 140 may issue a second local phone number to user device 110. The second local phone number may be local to a geographic area covered by second carrier network 140.

User device 110 may enter a coverage area (e.g., a part of the geographic area) associated with first carrier network 120. A component of first carrier network 120 may assign an IP address to user device 110. User device 110 may establish a connection with first carrier network 120. Establishing the connection with first carrier network 120 may include establishing a connection 150 with IMS core 125. To do so, a CSCF component (e.g., a P-CSCF) of/associated with IMS core 125 may receive authentication information (e.g., an identifier, a password, etc.) from user device 110. After the CSCF component authenticates user device 110, IMS core 125 may establish connection 150 with user device 110. Connection 150 may allow user device 110 to receive and/or place calls to other user devices by using the first local phone number, via IMS core 125.

The authentication information may be based on information associated with user device 110, including, for example, a device identifier (e.g., a mobile directory number (MDN), a landline directory number (LDN), an international mobile subscriber identity (IMSI), a mobile station international subscriber directory number (MSISDN), a SIM universal resource identifier (URI), etc.) and/or a device address (e.g., a media access control (MAC) address, etc.). The SIM card and/or another component of user device 110 may store one or more pieces of the aforementioned information as secret credential(s) unique to user device 110.

After establishing connection 150, user device 110 may establish a second connection (e.g., a connection 160 or a connection 170) with second carrier network 140 while user device 110 is still located in the coverage area associated with first carrier network 120. In one implementation, a direct connection (e.g., not via network 130) may exist between first carrier network 120 and second carrier network 140. When the direct connection exists, user device 110 may transmit the authentication information of user device 110 to a CSCF component of IMS core 145. The CSCF component of IMS core 145 may authenticate user device 110 and establish connection 160 between user device 110 and IMS core 145.

In another implementation, first carrier network 120 and second carrier network 140 may connect via network 130. User device 110 may transmit the authentication information of user device 110 to the CSCF component of IMS core 145 via media anchors (not shown in FIG. 1) of network 130. Here, the CSCF component of IMS core 145 may authenticate user device 110 and establish connection 170 between user device 110 and IMS core 145. After either connection 160 or connection 170 is established, user device 110 may receive and/or place calls, via IMS core 145, to other user devices by using the second local phone number. User device 110 may receive and/or place the calls without roaming even when user device 110 is located outside a coverage area associated with second carrier network 140 (e.g., while located in the coverage associated with first carrier network 120). A call is treated as a local call when user device 110 does not roam during the call.

Only first carrier network 120 and second carrier networks 140 (and no other carrier networks) have been illustrated in FIG. 1 for simplicity. In practice, user device 110 may simultaneously connect to two or more carrier networks, which have issued local phone numbers for use by the user of user device 110. For example, a third carrier may provide cellular phone service/coverage in a third country that is different than the first and second countries. The third carrier may issue a third local phone number, local to a location in the third country, for the user to use with user device 110. After establishing connection 150 with first carrier network 120 and establishing connection 160/170 with second carrier network 140, user device 110 may establish a third connection with an IMS core/network of the third carrier network.

A user of user device 110 may select to place calls, via the IMS core of the third carrier network, by using the third local phone number. The user device may also receive calls (and/or notifications about calls), via the IMS core of the third carrier network, from other user devices whose users dialed the third local phone number. User device 110 may receive/place calls via the IMS core of the third carrier network, without roaming, while in a geographic location associated with/covered by first carrier network 120 or second carrier networks 140.

Figure 2:
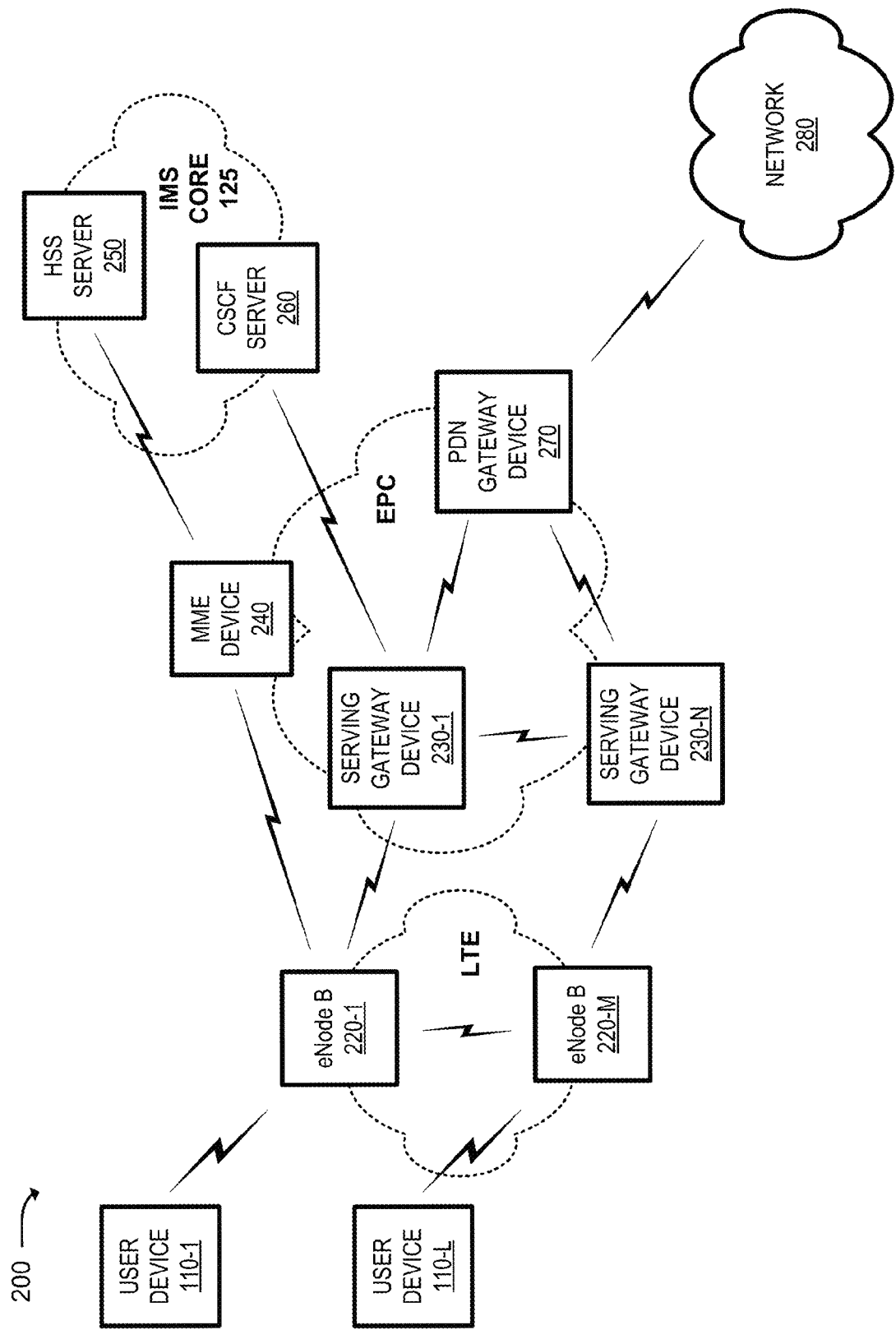
FIG. 2 is a diagram of an example portion of the environment of FIG. 1.

FIG. 2 is a diagram of an example portion 200 of environment 100. Portion 200 may include user device 110 and first carrier network 120 or a portion of first carrier network 120. As shown in FIG. 2, portion 200 may include a group of user devices 110-1, . . . , 110-L (where L≥1) (hereinafter referred to collectively as "user devices 110" and individually as "user device 110"), a group of e-Node Bs 220-1, . . . , 220-M (where M≥1) (hereinafter referred to collectively as "eNBs 220" and individually as "eNB 220"), a group of serving gateway devices 230-1, . . . , 230-N (where N≥1) (hereinafter collectively referred to as "SGWs 230" and individually as "SGW 230"), a mobility management entity device 240 (hereinafter referred to as "MME 240"), a home subscriber service server 250 (hereinafter referred to as an "HSS server 250"), a call session control function (CSCF) server 260 (hereinafter referred to as "CSCF server 260"), a packet data network (PDN) gateway device 270 (hereinafter referred to as a "PGW 270"), and a network 280. The number of devices, nodes, and/or networks, illustrated in FIG. 2, is provided for explanatory purposes only. In practice, there may be additional devices, nodes and/or networks; fewer devices, nodes, and/or networks; different devices, nodes and/or networks; or differently arranged devices, nodes and/or networks than illustrated in FIG. 2.

Also, in some implementations, one or more of the devices of portion 200 may perform one or more functions described as being performed by another one or more of the devices of portion 200. Further, MME 240, HSS server 250, and/or CSCF server 260 may be integrated into a single device. In another example, SGW 230 and/or PGW 270 may be integrated into a single device. Devices of portion 200 may interconnect via wired connections, wireless connections, or a combination of wired and wireless connections.

Portion 200 may include an evolved packet system (EPS) that includes a long term evolution (LTE) network and/or an evolved packet core (EPC) that operate based on a third generation partnership project (3GPP) wireless communication standard. The EPS may process calls between user devices that are associated with the same LTE network (e.g., local calls) and/or between user devices that are associated with different network (e.g., non-local calls, long distance calls, etc.).

The LTE may be a radio access network (RAN) that includes one or more eNBs 220 via which user device 110 communicates with the EPC and/or other user devices 110. The EPC may include SGW 230, MME 240, and/or PGW 270 that enables user device 110 to communicate with network 280, other user devices 110, and/or IMS core 125. IMS core 125 may include HSS server 250 and/or CSCF server 260 and may manage authentication, session initiation, account information, profile information, etc. associated with user device 110.

eNB 220 may include one or more devices that receive, process, and/or transmit traffic, such as voice, video, text, and/or other data, destined for and/or received from user device 110. One or more eNBs 220 may be associated with the LTE network that receives traffic from and/or sends traffic to network 280 and/or IMS core 125 via the EPC. eNB 220 may send traffic to and/or receive traffic from user device 110 via an air interface.

SGW 230 may include one or more devices, or other types of computation or communication devices, that gather, process, search, store, and/or provide information in a manner described herein. SGW 230 may, for example, aggregate traffic received from one or more eNBs 220 and may send the aggregated traffic to network 280 (e.g., via PGW 270) and/or other devices associated with IMS core 125 and/or the EPC. SGW 230 may also receive traffic from the other network devices and/or may send the received traffic to user device 110 via eNB 220. For example, SGW 230 may receive an instruction (e.g., as a result of a registration operation, handoff operation, and/or some other operation) from MME 240 to establish a connection (e.g., a tunnel) that permits user device 110 to communicate with other user devices 110 and/or network devices associated with the LTE, EPC, IMS core 125, and/or network 280.

MME 240 may include one or more devices, or other types of computation or communication devices, that gather, process, search, store, and/or provide information in a manner described herein. For example, MME 240 may perform operations associated with a handoff to and/or from the EPS. MME 240 may perform operations to register user device 110 with the EPS, to handoff user device 110 from the EPS to another network, to handoff a user device 110 from the other network to the EPS, and/or to perform other operations. MME 240 may perform policing operations on traffic destined for and/or received from user device 110.

HSS server 250 may include one or more server devices, or other types of computation or communication devices, that gather, process, search, store, and/or provide information in a manner described herein. For example, HSS server 250 may manage, update, and/or store, in a memory associated with HSS server 250, service profile information associated with user device 110 that includes access point names (APNs) that are permitted for and/or accessible by user device 110, information associated with a user of user device 110 (e.g., a username, a password, a personal identification number (PIN), etc.), rate information, minutes allowed, and/or other information. Additionally, or alternatively, HSS server 250 may include a device that performs authentication, authorization, and/or accounting (AAA) operations associated with a communication session with user device 110.

CSCF server 260 may include one or more server devices, or other types of computation or communication devices, that gather, process, search, store, and/or provide information in a manner described herein. CSCF server 260 may execute session initiation protocols (SIPs) associated with establishing a session with user device 110. CSCF server 260 may communicate via network 280 and may process and/or route calls to and/or from user device 110. CSCF server 260 may, for example, route a call received from user device 110 (e.g., via eNB 220) and may route the call to a destination device and/or perform operations associated with monitoring minutes and/or billing information.

CSCF server 260 may include one or more I-CSCFs, S-CSCFs, and/or P-CSCFs. An I-CSCF may provide a SIP function. An IP address of the I-CSCF may be published in a Domain Name System (DNS) so that remote servers can find the I-CSCF and use the I-CSCF as a forwarding point for SIP packets. The I-CSCF may query one or more databases stored in HSS server 250 to retrieve a user location, and may then route a SIP request to its assigned S-CSCF. The S-CSCF may be a central node of the signaling plane, and may perform session control. The S-CSCF may handle SIP registrations, may inspect signaling messages, may decide to which application server(s) a SIP message may be forwarded, may provide routing services, etc. A P-CSCF may function as a proxy server for user device 110, where SIP signaling traffic to and from user device 110 may go through the P-CSCF. The P-CSCF may validate and then forward requests from user device 110, and may process and forward responses to user device 110.

CSCF server 260 may also include a policy and charging rules function (PCRF) that may perform operations that enforce EPS policies associated with a communication session with user device 110. For example, the PCRF may dynamically provide real-time bandwidth allocations and/or controls (e.g., associated with a particular APN) associated with particular applications, network accesses, and/or services provided to user device 110 during a communication session. The PCRF may also dynamically provide a real-time signal flow policy to adapt to changing conditions within the network and/or to manage traffic flow during the communication session.

CSCF server 260 may receive a query from SGW 230 to identify via which eNB 220 and/or other SGW 230 a call is to be routed to a destination user device 110. CSCF server 260 may use information associated with the destination user device 110 on which to base the determination (e.g., from a look up table) via which eNB 220 and/or other SGW 230 the call is to be routed. Based on the determination, CSCF server 260 may send information, associated with the identified eNB 220 and/or the other SGW 230, to SGW 230.

PGW 270 may include one or more devices, or other types of computation or communication devices, that gather, process, search, store, and/or provide information in a manner described herein. In one example implementation, PGW 270 may include a device that aggregates traffic received from one or more SGWs 230 and may send the aggregated traffic to network 280 and/or IMS core 125 (e.g., CSCF server 260). In another example implementation, PGW 270 may receive traffic from network 280 and may send the traffic to user device 110 via SGW 230 and/or eNB 220. PGW 270 may perform policing operations on traffic destined for the EPS.

Network 280 may include one or more wired and/or wireless networks. For example, network 280 may include a cellular network, a public land mobile network (PLMN), a second generation (2G) network, a third generation (3G) network, a fourth generation (4G) network, a fifth generation (5G) network, and/or another network. Additionally, or alternatively, network 280 may include a wide area network (WAN), a metropolitan area network (MAN), a telephone network (e.g., the Public Switched Telephone Network (PSTN)), an ad hoc network, an intranet, the Internet, a fiber optic-based network (e.g., a FiOS network), and/or a combination of these or other types of networks. Network 280 may transport traffic to and/or from the EPS (e.g., via PGW 270) and/or another network. In another implementation, network 280 may include network 130.

Figure 3:
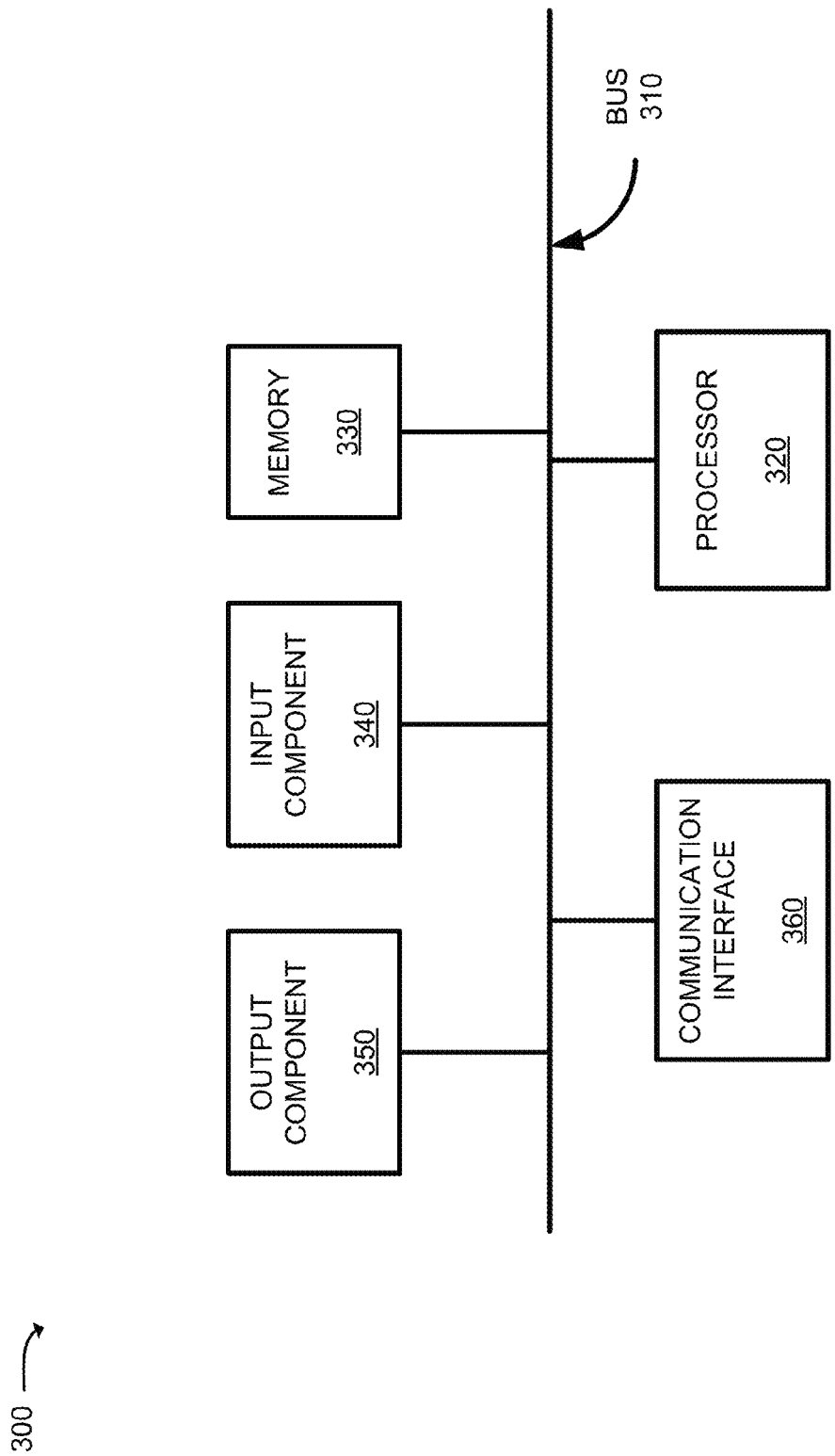
FIG. 3 is a diagram of example components of one or more devices of FIG. 2.

FIG. 3 is a diagram of example components of a device 300. Device 300 may correspond to user device 110, MME 240, HSS server 250, and/or CSCF server 260. Alternatively, or additionally, each of user device 110, MME 240, HSS server 250, and/or CSCF server 260 may include one or more devices 300.

Device 300 may include a bus 310, a processor 320, a memory 330, an input component 340, an output component 350, and a communication interface 360. Although FIG. 3 shows example components of device 300, in other implementations, device 300 may contain fewer components, additional components, different components, or differently arranged components than depicted in FIG. 3. For example, device 300 may include one or more switch fabrics instead of, or in addition to, bus 310. Additionally, or alternatively, one or more components of device 300 may perform one or more tasks described as being performed by one or more other components of device 300.

Bus 310 may include a path that permits communication among the components of device 300. Processor 320 may include a processor, microprocessor, or processing logic that may interpret and execute instructions. Memory 330 may include any type of dynamic storage device that may store information and instructions, for execution by processor 320, and/or any type of non-volatile storage device that may store information for use by processor 320.

Input component 340 may include a mechanism that permits a user to input information to device 300, such as a keyboard, a keypad, a button, a switch, etc. Output component 350 may include a mechanism that outputs information to the user, such as a display, a speaker, one or more light emitting diodes (LEDs), etc. Communication interface 360 may include any transceiver-like mechanism that enables device 300 to communicate with other devices and/or systems via wireless communications (e.g., radio frequency, infrared, and/or visual optics, etc.), wired communications (e.g., conductive wire, twisted pair cable, coaxial cable, transmission line, fiber optic cable, and/or waveguide, etc.), or a combination of wireless and wired communications. For example, communication interface 360 may include mechanisms for communicating with another device or system via a network, such as network 180. In one alternative implementation, communication interface 360 may be a logical component that includes input and output ports, input and output systems, and/or other input and output components that facilitate the transmission of data to other devices.

As will be described in detail below, device 300 may perform certain operations relating call processing. Device 300 may perform these operations in response to processor 320 executing software instructions contained in a computer-readable medium, such as memory 330. A computer-readable medium may be defined as a non-transitory memory device. A memory device may include space within a single physical memory device or spread across multiple physical memory devices. The software instructions may be read into memory 330 from another computer-readable medium or from another device. The software instructions contained in memory 330 may cause processor 320 to perform processes described herein. Alternatively, hardwired circuitry may be used in place of or in combination with software instructions to implement processes described herein. Thus, implementations described herein are not limited to any specific combination of hardware circuitry and software.

Figure 4:
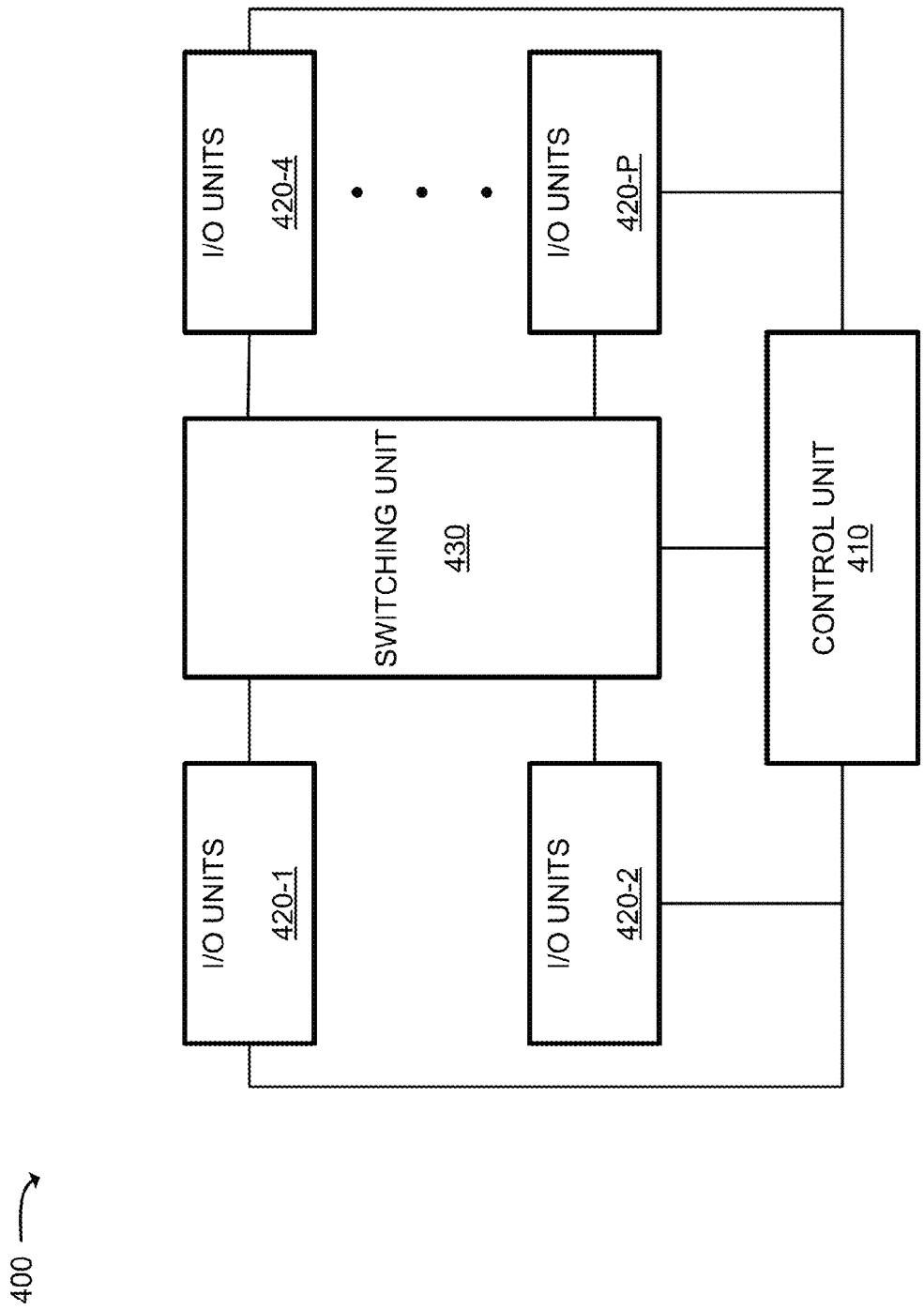
FIG. 4 is a diagram of example components of one or more nodes of FIG. 2.

FIG. 4 is a diagram of example components of a node 400 that may correspond to one or more of SGW 230 and/or PGW 270. Alternatively, or additionally SGW 230 and/or PGW 270 may include one or more nodes 400. Node 400 may include a data transfer device, such as a gateway, a switch, a firewall, a network interface card (NIC), a router, a hub, a bridge, a proxy server, an optical add-drop multiplexer (OADM), or some other type of device that processes and/or transfers traffic.

Node 400 may receive network traffic, as one or more packet stream(s), from physical links, may process the packet stream(s) to determine destination information, and may transmit the packet stream(s) out on links in accordance with the destination information. Node 400 may include a control unit 410, a set of input/output (I/O) units 420-1, . . . , 420-P (where P≥1) (hereinafter referred to collectively as "I/O units 420" and individually as "I/O unit 420"), and a switching unit 430.

Control unit 410 may include a processor, a microprocessor, or some form of hardware logic (e.g., an application specific integrated circuit (ASIC) or a field programmable gate array (FPGA)). In one example implementation, control unit 410 may include an Ethernet controller and/or another controller device. Control unit 410 may perform high level management functions for node 400. For example, control unit 410 may maintain the connectivity and manage information/data necessary for transferring packets by node 400. Control unit 410 may create routing tables based on network topology information, create forwarding tables based on the routing tables, and communicate the forwarding tables to I/O units 420. I/O units 420 may use the forwarding tables to perform route lookup for incoming packets and perform the forwarding functions for node 400. Control unit 410 may also perform other general control and monitoring functions for node 400.

I/O unit 420 may include a component or collection of components to receive incoming packets, to process incoming and/or outgoing packets, and/or to transmit outgoing packets. For example, I/O unit 420 may include I/O ports, a packet forwarding component (PFC), an Ethernet interface and/or another type of interface, a central processing unit (CPU), and/or a memory device. I/O unit 420 may include a collection of ports that receive or transmit packets via physical links. I/O unit 420 may also include packet processing component(s), switch interface component(s), Internet processor component(s), memory device(s), etc.

Each of I/O units 420 may be connected to control unit 410 and switching unit 430. I/O units 420 may receive packet data on physical links connected to a network (e.g., first carrier network 120). Each physical link could be one of many types of transport media, such as an optical fiber or an Ethernet cable.

I/O units 420 may process incoming packet data prior to transmitting the data to another I/O unit 420 or the network. I/O units 420 may perform route lookups for the data using the forwarding table from control unit 410 to determine destination information. If the destination indicates that the data should be sent out on a physical link, connected to I/O unit 420, then I/O unit 420 may prepare the data for transmission by, for example, adding any necessary headers and/or modifying existing headers, and/or transmitting the data from the port associated with the physical link. If the destination indicates that the data should be sent to another I/O unit 420 via switching unit 430, then I/O unit 420 may, if necessary, prepare the data for transmission to the other I/O unit 420 and/or may send the data to the other I/O unit 420 via switching unit 430.

Switching unit 430 may include one or multiple switching planes to facilitate communication among I/O units 420 and/or control unit 410. In one implementation, each of the switching planes may include a single-stage switch or a multi-stage switch of crossbar elements. Switching unit 430 may also, or alternatively, include processors, memories, and/or paths that permit communication among I/O units 420 and/or control unit 410.

As will be described in detail below, device 400 may perform certain operations associated with call processing and/or data transfer. Device 400 may perform these operations in response to control unit 410 and/or one or more I/O units 420 executing software instructions contained in a computer-readable medium, such as a memory associated with control unit 410 and/or the one or more I/O units 420, respectively. The software instructions may be read into the memory from another computer-readable medium or from another device. The software instructions contained in the memory may cause control unit 410 and/or the one or more I/O units 420 to perform processes described herein. Alternatively, hardwired circuitry may be used in place of or in combination with software instructions to implement processes described herein. Thus, implementations described herein are not limited to any specific combination of hardware circuitry and software.

Although, FIG. 4 illustrates example components of node 400, in other implementations, node 400 may include additional components, fewer components, different components, or differently arranged components than those illustrated in FIG. 4 and described herein. Additionally, or alternatively, one or more operations described as being performed by a particular component of node 400 may be performed by one or more other components, in addition to or instead of the particular component of node 400.

Figure 5:
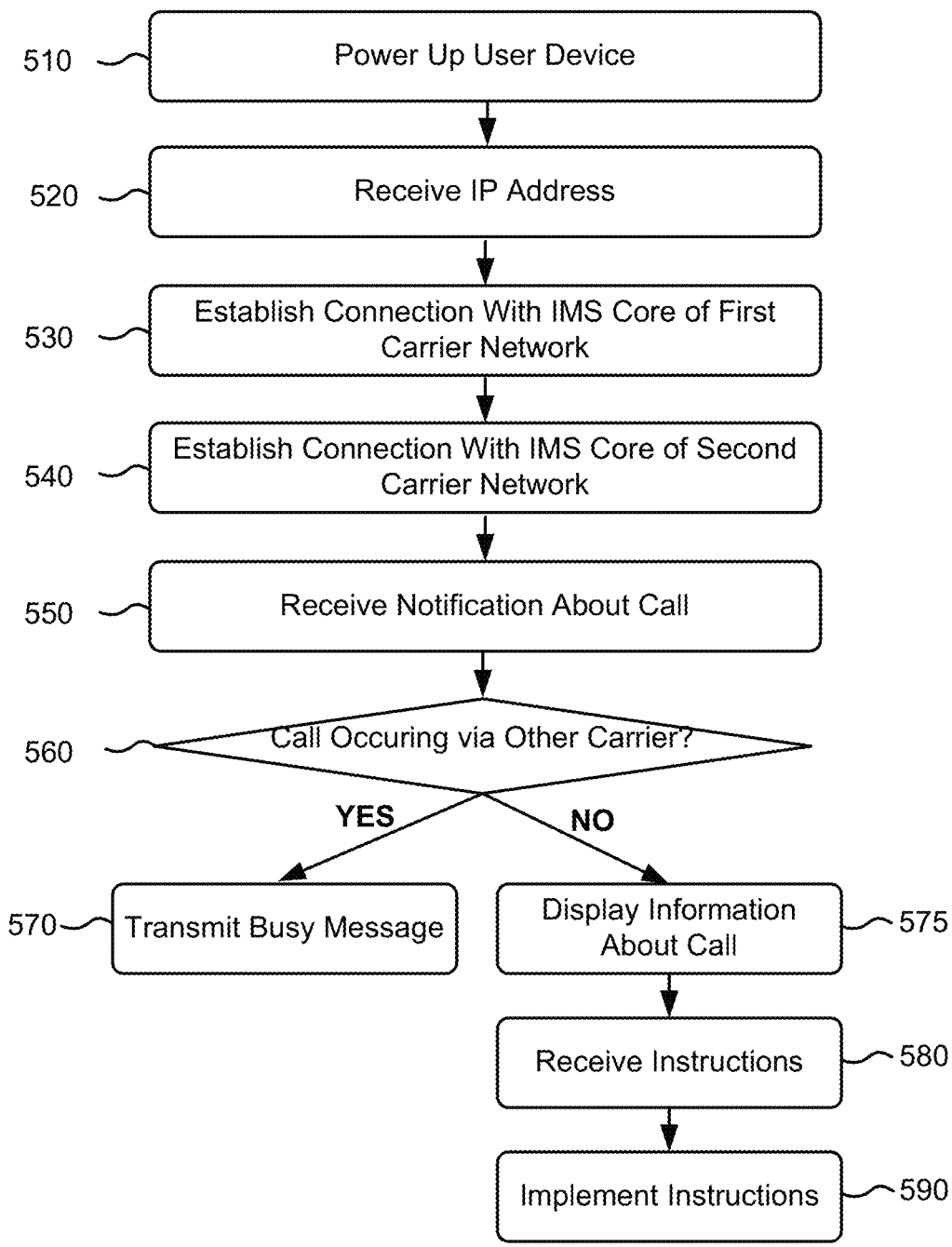
FIG. 5 is a flowchart of an example process for connecting a user device via multiple carriers.

FIG. 5 is a flowchart of an example process 500 for connecting user device 110 via multiple carriers. In one example implementation, user device 110 may perform process 500. Alternatively, process 500 may be performed by one or more other devices, alone or in combination with user device 110.

As shown in FIG. 5, process 500 may include powering up a user device 110 (block 510). For example, a user of user device 110 may become a subscriber of a cellular phone service of a first carrier. The first carrier may provide the cellular phone service via first carrier network 120 in a first geographic area (e.g., the USA) that is under a coverage area of first carrier network 120. The first carrier may issue a first local phone number (e.g., (202) 867-5309) that the user may use for user device 110. The first geographic area may include an area (e.g., Washington, D.C.) corresponding to the area code (e.g., 202) of the first local phone number.

The user of user device 110 may also become a subscriber of a cellular phone service of a second carrier. The second carrier may provide the cellular phone service via second carrier network 140 in a second geographic area (e.g., Israel) that is under a coverage area of second carrier network 140. The second carrier may issue a second local phone number (e.g., 02.1234567) that the user may use for user device 110. The second geographic area may include an area (e.g., Jerusalem) corresponding to the area code (e.g., 02) of the second local phone number. After subscribing to cellular phone services of the first carrier and the second carrier, the user may utilize user device 110 to place and/or receive calls associated with the first local phone number or the second local phone number, while user device 110 is located within the first geographic area or the second geographic area, without roaming. To do so, the user may, first, press a power button of user device 110. In response, user device 110 may power up and activate/execute an IMS client (application) of user device 110.

An IP address may be received (block 520). For example, before or after user device 110 powers up, the user may enter, with user device 110, the coverage area of first carrier network 120. User device 110 may connect to first carrier network 120 via eNB 220 of the LTE (FIG. 2). SGW 230 and PGW 270 may receive information about (e.g., including authentication information associated with) user device 110. In response, PGW 270 may determine an IP address for user device 110. PGW 270 may transmit the IP address, via SGW 230 and eNB 220, to user device 110. User device 110 may receive the IP address.

A connection may be established with an IMS core of a first carrier network (block 530). For example, user device 110 may retrieve a secret credential stored in a SIM card of user device 110. User device 110 (e.g., the IMS client of user device 110) may generate authentication information by utilizing an IMS Authentication and Key Agreement (IMS AKA) protocol. The authentication information may include a temporary identifier (ID) based on the first local phone number, the secret credential, etc. User device 110 may transmit the authentication information in a message (e.g., a Common Industrial Protocol (CIP) message) to first carrier network 120. SGW 230 and/or others components of first carrier network 120 may transmit the message with the authentication information, associated with user device 110, to a P-CSCF of CSCF server 260. The P-CSCF of CSCF server 260 may rely on the IMS AKA protocol to authenticate user device 110 based on the authentication information. Once the P-CSCF of CSCF server 260 authenticates user device 110, the P-CSCF of CSCF server 260 may generate and/or transmit a confirmation message to user device 110. As a result, mutual authentication may occur between user device 110 and IMS core 125 of first carrier network 120 when user device 110 receives the confirmation message. After the mutual authentication, connection 150 may be established between user device 110 and IMS core 125 of first carrier network 120.

A connection may be established with an IMS core of a second carrier network (block 540). For example, after connection 150 is established between user device 110 and IMS core 125 of the first carrier, the IMS client of user device 110 may establish a connection with IMS core 145 of the second carrier. To do so, user device 110 may generate/transmit a message (e.g., a CIP message) that includes the authentication information. The message may also include the IP address assigned to user device 110. In one implementation, when a direct connection exists between the first carrier and the second carrier, user device 110 may transmit the message, via first carrier network 120, to second carrier network 140. In another implementation, user device 110 may transmit the message, via first carrier network 120 and network 130, to second carrier network 140.

A P-CSCF of second carrier network 140 may receive the message and authenticate user device 110, by using the IMS AKA protocol, based on the authentication information in the message. In another implementation, the P-CSCF (and/or another component) of second carrier network 140 may request an authentication vector from first carrier network 120. The P-CSCF of second carrier network 140 may use the authentication vector to authenticate user device 110 based on the authentication information. Once the P-CSCF of second carrier network 140 authenticates user device 110, the P-CSCF of second carrier network 140 may generate and/or transmit a second confirmation message to user device 110. As a result, mutual authentication may occur between user device 110 and IMS core 145 of second carrier network 140 when user device 110 receives the second confirmation message.

After the mutual authentication, connection 160 or connection 170 is established between user device 110 and IMS core 145 of second carrier network 140. In other implementations, user device 110 may establish connections with one or more other carrier networks after connecting to second carrier network 140 in a manner similar to establishing connection 160/170 with second carrier network 140. User device 110 may use each one of the other carrier networks, in addition to first carrier network 120 and second carrier network 140, to place/receive calls.

A notification about a call may be received (block 550). For example, after user device 110 establishes connection 150 with IMS core 120 of first carrier network 120, user device 110 may perform/announce a presence Announcing a presence may include announcing to IMS core 125 that user device 110, which is accessible by dialing the first local phone number (e.g., (202) 867-5309), is available to receive calls from other user devices. Assume that a second user device may dial the first local phone number (e.g., (202) 867-5309). An I-CSCF, associated with a carrier network (e.g., first carrier network 120) to which the second user device is connected, may transmit a request to a S-CSCF of CSCF server 260 of first carrier network 120. The S-CSCF of CSCF server 260 of first carrier network 120 may transmit a notification about the call, from the second user device, to user device 110. User device 110 may receive the notification about the call.

Process 500 may further include determining whether a call is occurring via another carrier (block 560). For example, user device 110 may differentiate between calls received via IMS core 125 of first carrier network 120 and calls received via IMS core 145 of second carrier network 140. As a result, user device 110 may determine whether a different user device dialed the first local phone number or the second local phone number to place a call (that is occurring) to user device 110. User device 110 may determine, after receiving the notification about the call from the second user device via IMS core 125, whether user device 110 is engaged in an ongoing call that was received via IMS core 145 of second carrier network 140.

If user device 110 determines that a call is occurring via the other carrier (e.g., via second carrier network 140) (block 560-YES), a busy message may be transmitted (block 570). For example, prior to receiving the notification about the call from the second user device, assume that: a third user device dialed the second local phone number issued by second carrier network 140; user device 110 received a notification, from IMS core 145, about the call from the third user device; and the user of user device 110 accepted the call from the third user device. If the call with the third user device is occurring (e.g., voice data is being exchanged between user device 110 and the third user device) when user device receives the notification about the call from the second user device, then user device 110 may determine that a call is occurring via second network carrier 140. Accordingly, in response to the notification about the call from the second user device, user device 110 may transmit a busy message (e.g., a busy signal) to IMS core 125. IMS core 125 may forward the busy message to the second user device. The busy message may notify the second user device that the user of user device 110 is on another call and cannot/will not accept the call from the second user device.

If user device 110 determines that a call is not occuring via the other carrier (block 560-NO), information about the call may be displayed (block 575), instructions may be received (block 580), and the instructions may be implemented (block 590). For example, user device 110 may determine that user device 110 is not on an ongoing via second carrier network 140. In response, user device 110 may determine information about the call, from the second user device, based on the notification. The information may include a phone number of the second user device and that the second user device dialed the first local phone number to reach user device 110. User device 110 may display the information on a display of user device 110.

User device 110 may further allow the user to provide instructions regarding how to proceed with the call. The user may accept the call, reject the call, send the call to voicemail, etc. If the user accepts the call, user device 110 may transmit a message to IMS 125 that user device 110 accepts the call from the second user device. In one implementation, IMS core 125 may establish a connection (e.g., a voice path) for the call, to exchange voice data by utilizing the IP address assigned to user device 110 and an IP address associated with the second user device. In another implementation, IMS core 125 may establish the connection between IMS core 125 and another non-IMS network (e.g., PSTN).

Figure 6:
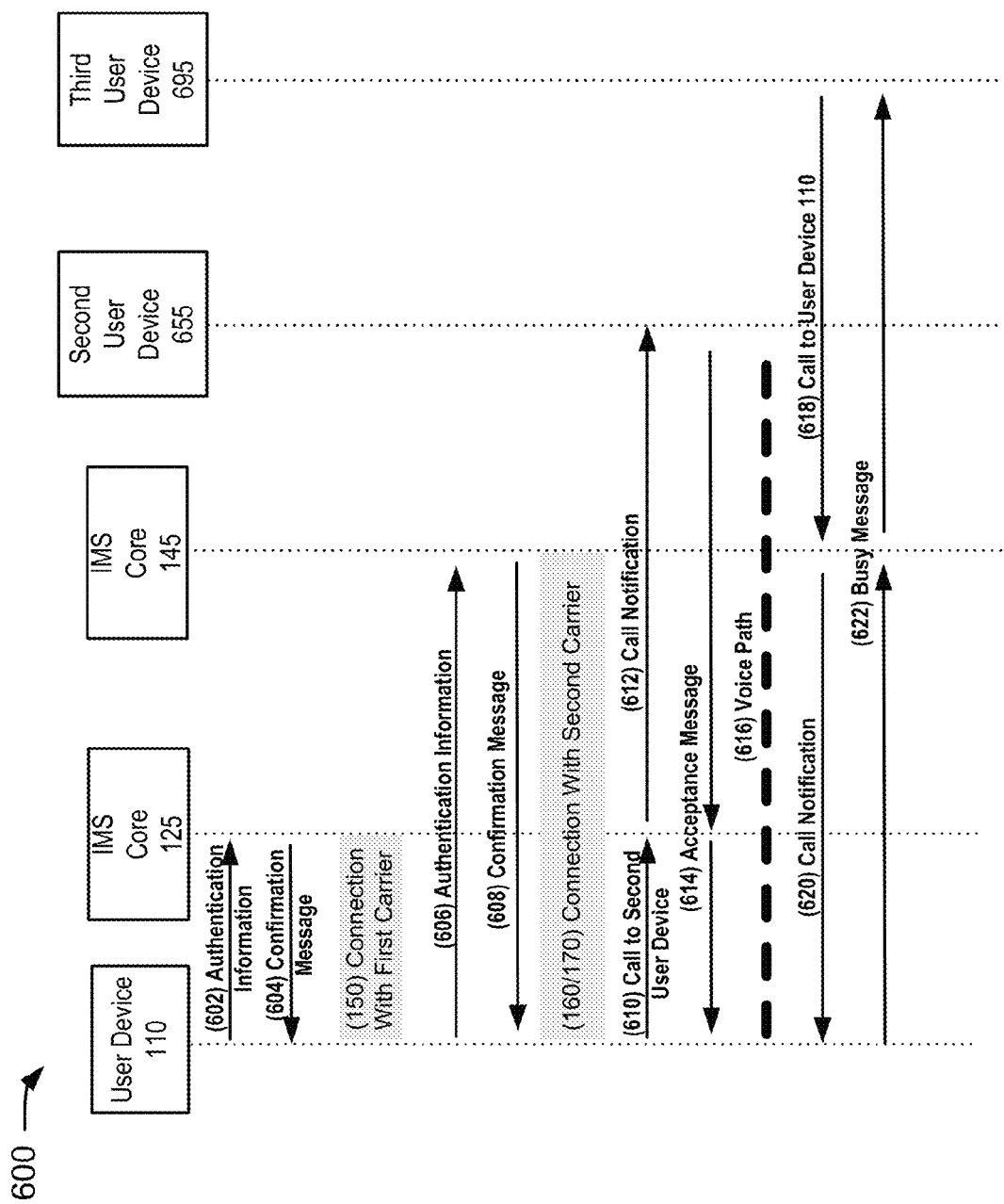
FIG. 6 is a flow diagram of an example of connecting a user device via multiple carriers.

FIG. 6 is a flow diagram 600 of an example of connecting a user device via multiple carriers. For example, a user of user device 110 may live and work in Washington, D.C., USA and Mexico City, Mexico. The user may want to, simultaneously, allow people from Washington, D.C. to call user device 110 via a first local phone number associated with Washington, D.C. and allow people from Mexico City to call user device 110 via a second local phone number associated with Mexico City. To do so, the user may subscribe to a cellular phone service provided by an American carrier and to a cellular phone service provided by a Mexican carrier (e.g., the American carrier and the Mexican carrier may include entities of the same and/or different companies that are or are not partners). The American carrier may provide the cellular phone service in the USA via first cellular network 120. After the user subscribes, the American carrier may issue the first local phone number (e.g., (202) 867-5309) for user device 110. The Mexican carrier may provide the cellular phone service in Mexican via second cellular network 140. After the user subscribes, the Mexican carrier may issue the second local phone number (e.g., (55) 5555 1111) for user device 110.

For example, while in Washington, D.C., user device 110 may, first, establish a connection with first cellular network 120 of the American carrier. As shown in FIG. 6, user device 110 may transmit authentication information 602 to IMS core 125 of first carrier network 120. A CSCF component of IMS core 125 may authenticate user device (e.g., that user device 110 may connect to IMS core 125) based on authentication information 602. The CSCF component or a different CSCF component of IMS core 125 may transmit a confirmation message 604 to confirm the authentication of user device 110. Thereafter, connection 150 may form between user device 110 and IMS core 125.

After establishing connection 150 with first carrier network 120 and while still located in Washington, D.C., user device 110 may transmit authentication information 606 to IMS core 145 in order to establish a connection 160/170 with second carrier network 140. Authentication information 606 may include the same information as authentication information 602. User device 110 may also transmit an IP address, assigned to user device 110 by first carrier network 120, together with authentication information 606. A CSCF component of IMS core 145 may authenticate user device 110 (e.g., that user device 110 may connect to IMS core 145) based on authentication information 606. The CSCF component and/or a different CSCF component of IMS core 145 may transmit a confirmation message 608 to confirm the authentication of user device 110 (e.g., that user device 110 may connect to IMS core 145 of second carrier network 140). A connection 160/170 may be established between user device 110 and IMS core 145.

After user device 110 establishes connection 150 with IMS core 125 of first carrier network 120 and connection 160/170 with IMS core 145 of second carrier network 140, user device 110 may allow the user to place a call via IMS core 125 of first carrier network 120, by using the first local phone number, or via IMS core 145 of second carrier network 140, by using the second local phone number. For example, the user may decide to call an American user of a second user device 655. The user may utilize (e.g., a keypad or touch screen of) user device 110 to select the first local phone number (e.g., (202) 867-5309) in order to make the call via the first carrier network. In another implementation, the user may use user device 110 to select the American carrier associated with first carrier network 120. After the selection, the user may dial an outgoing phone number (e.g., (202) 994-2000) to call second user device 655. In response, user device 110 may make a call 610 to second user device 655.

A CSCF component of IMS core 125 may receive call 610 to second user device 655 and/or information about call 610 to second user device 655. The CSCF component of IMS core 125 may determine how to (e.g., via what IMS core) to reach second user device 655. The CSCF component of IMS core 125 may transmit a call notification 612 about call 610 to second user device 655. The CSCF component of IMS core 125 may transmit call notification 612 via another CSCF component of IMS core 125 or a different IMS network associated with second user device 655. When second user device 655 receives call notification 612, call notification 612 may include an invitation to accept call 610 from user device 110.

The American user of second user device 655 may accept call 610. In response, second user device 655 may transmit an acceptance message 614 to user device 110 via IMS core 125 and/or the other IMS core associated with second user device 655. As a result, a voice path 616 may be established, via IMS core 125, between user device 110 and second user device 655. The user of user device 110 and the American user of second user device 655 may talk to each other (i.e., exchange voice data) via voice path 616.

While the user of user device 110 talks to the American user of second user device 655, a Canadian user of third user device 695, who works with the user of user device 110 in Mexico, may decide to call the user of user device 110 while the Canadian user is in Canada. To do so, the Canadian may dial the second local phone number (e.g., (55) 5555 1111), to reach user device 110, by using third user device 695. In response, third user device 695 may place a call 618 to user device 110. A CSCF component of an IMS network, of a carrier network in Canada, associated with third user device 695 (herein, a "Canadian CSCF component") may receive call 618 to user device 110 and/or information about call 618. The Canadian CSCF component may determine that the second local phone number (e.g., (55) 5555 1111) is of a user device (i.e., user device 110) that is associated with IMS core 145. The Canadian CSCF component may transmit a request for user device 110 to accept call 618. A CSCF component of IMS core 145 may receive the request and transmit a call notification 620 to user device 110 for call 618.

User device 110 may receive call notification 620. In response, user device 110 may determine that user device 110 is currently being used for an ongoing call via IMS core 125 (via voice path 616) of first carrier network 120. In response, user device 110 may transmit a busy message 622 to third user device 695 via IMS core 145 and the IMS network associated with third user device 695. Busy message 622 may indicate that the user of user device 110 may not receive call 618 from the Canadian user at the time of call 618. The Canadian user may decide to leave a voice mail or to call user device 110 at a later point in time. In another implementation, the user of user device 110 may interrupt voice path 616 (e.g., place call 610 with second user device 655 on hold) and accept call 618 to user device 110 from the Canadian user.

The foregoing description provides illustration and description, but is not intended to be exhaustive or to limit the invention to the precise form disclosed. Modifications and variations are possible in light of the above teachings or may be acquired from practice.

While a series of blocks has been described with regards to FIG. 5, the order of the blocks may be modified in other implementations. Further, non-dependent blocks may be performed in parallel.

It will be apparent that systems and methods, as described above, may be implemented in many different forms of software, firmware, and hardware in the implementations illustrated in the figures. The actual software code or specialized control hardware used to implement these systems and methods is not limiting of the implementations. Thus, the operation and behavior of the systems and methods were described without reference to the specific software code-it being understood that software and control hardware can be designed to implement the systems and methods based on the description herein.

Even though particular combinations of features are recited in the claims and/or disclosed in the specification, these combinations are not intended to limit the disclosure of the invention. In fact, many of these features may be combined in ways not specifically recited in the claims and/or disclosed in the specification. Although each dependent claim listed below may directly depend on only one other claim, the disclosure includes each dependent claim in combination with every other claim in the claim set.

No element, act, or instruction used in the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A method comprising:
receiving, by a user device, an Internet Protocol address from a radio access network;
establishing, by the user device, a first connection with a first Internet Protocol multimedia subsystem (IMS) core of a first carrier network of a first carrier using the radio access network and the received Internet Protocol address, wherein the first carrier issues a first phone number used by the user device;
establishing, by the user device, a second connection with a second IMS core of a second carrier network of a second carrier using the radio access network, the received Internet Protocol address, and the first carrier network, wherein the second carrier issues a second phone number used by the user device;
receiving, by the user device, notification about a first call from the first carrier network;
determining, by the user device, whether, at a time when the notification is received, the user device is using the second carrier network for a second call; and
transmitting, by the user device, a busy message to the first carrier network when, at the time when the notification is received, the user device is using the second carrier network for the second call.

2. The method of claim 1, where establishing the first connection comprises:
generating authentication information based on information stored in a subscriber identity module (SIM) card of the user device,
transmitting the authentication information to a first call session control function (CSCF) component of the first carrier network, and
establishing the first connection between the user device and the first IMS core of the first carrier network associated with the first CSCF component.

3. The method of claim 2, where establishing the second connection comprises:
transmitting, via the first carrier network, the authentication information to a second CSCF component of the second carrier network, and
establishing the second connection between the user device and the second IMS core of the second carrier network associated with the second CSCF component.

4. The method of claim 1, where the first carrier network provides cellular phone service within a first country, and where the second carrier network provides cellular phone service within a second country that is different than the first country.

5. The method of claim 4, further comprising:
establishing a third connection with a third carrier network of a third carrier, where the third carrier issues a third phone number used by the user device, and where the third carrier network provides cellular phone service in a third country, where the third country is different than the first country and the second country.

6. The method of claim 4, where the first call is a local call when the user device is within the first country or the second country and an area code associated with an origin of the first call is equal to an area code of the first phone number.

7. The method of claim 1, further comprising:
displaying information about the first call when the user device is not using the second carrier network at the time when the notification is received, where the information about the first call comprises information specifying that the first phone number was dialed to place the first call.

8. The method of claim 1, further comprising:
receiving a selection associated with the first phone number or the second phone number;
receiving an outgoing phone number for a call to a different user device;
placing the call to the different user device via the first IMS of the first carrier network when the selection is associated with the first phone number; and
placing the call to the different user device via the second IMS core of the second carrier network when the selection is associated with the second phone number.

9. A device comprising:
a circuit card to store an identifier associated with the device; and
a processor configured to:
generate authentication information based on the identifier;
receive an Internet Protocol address from a radio access network;
transmit the authentication information to a first carrier network using the radio access network and the received Internet Protocol address, wherein the first carrier network provides cellular phone service within a first geographic area,
establish a first connection with an Internet protocol (IP) multimedia subsystem (IMS) core of the first carrier network after receiving a first confirmation, in response to the authentication information, from the first carrier network,
transmit the authentication information to a second carrier network using the radio access network, the received Internet Protocol address, and the first carrier network, wherein the second carrier network provides cellular phone service within a second geographic area, and wherein the first geographic area is different from the second geographic area, and
establish a second connection with an IMS core of the second carrier network after receiving a second confirmation, in response to the authentication information, from the second carrier network.

10. The device of claim 9, where the processor utilizes an IMS Authentication and Key Agreement (IMS AKA) protocol to generate the authentication information.

11. The device of claim 9, wherein the processor is further configured to:
receive a selection of a carrier associated with the first carrier network and an outgoing phone number of a first user device, and
place a first call, via the first carrier network, to a second user device.

12. The device of claim 11, wherein the processor is further configured to:
receive a notification, during the first call and from the IMS core of the second carrier network, about a second call from a second user device to the device.

13. The device of claim 9, wherein the processor is further configured to:
receive a notification about a first call from the first carrier network,
determining, at a time when the notification is received, whether the device is using the second carrier network for a second call, and
transmitting, at the time when the notification is received, a busy message to the first carrier network when the device is using the second carrier network for the second call.

14. The device of claim 13, where the first call is a local call in the first geographic area, and where the second call is a local call in the second geographic area.

15. The device of claim 9, wherein the processor is further configured to:
announce, after establishing the first connection, a presence to the IMS core of the first carrier network, and
announce, after establishing the second connection, a presence to the IMS core of the second carrier network.

16. The device of claim 15, wherein, when announcing the presence to the IMS core of the first carrier network, the processor is further configured to:

announce to the IMS core of the first carrier network that the device is accessible by dialing a phone number issued by an operator of the first carrier network.

17. One or more non-transitory computer-readable media storing instructions executable by one or more processors of a computing device, the non-transitory computer-readable media storing one or more instructions for:

receiving an Internet Protocol address from a radio access network;

establishing a first connection with a first Internet Protocol multimedia subsystem (IMS) core of a first carrier network of a first carrier using the radio access network and the received Internet Protocol address, wherein the first carrier network provides cellular phone service within a first geographic area;

establishing a second connection with a second IMS core of a second carrier network of a second carrier using the radio access network, the received Internet Protocol address, and the first carrier network, wherein the second carrier network provides cellular phone service within a second geographic area, and where the first geographic area is different from the second geographic area;

placing a first call, via the first carrier network and while located within the second geographic area, by using a first phone number associated with the first carrier network; and receiving, via the second carrier network and during an occurrence of the first call, a notification about a second call.

18. The non-transitory computer-readable media of claim 17, wherein establishing the first connection comprises:

transmitting authentication information, based on information stored in a subscriber identity module (SIM) card, to a first CSCF component of the first carrier network.

19. The non-transitory computer-readable media of claim 18, further storing instructions for:

establishing a third connection with a third carrier network of a third carrier, where the third carrier network provides cellular phone service within a third geographic area.

20. The non-transitory computer-readable media of claim 19, further storing instructions for:

receiving or placing calls via an IMS core of the third carrier network, without roaming, while located within the second geographic area.

\* \* \* \* \*